Patented Nov. 13, 1951

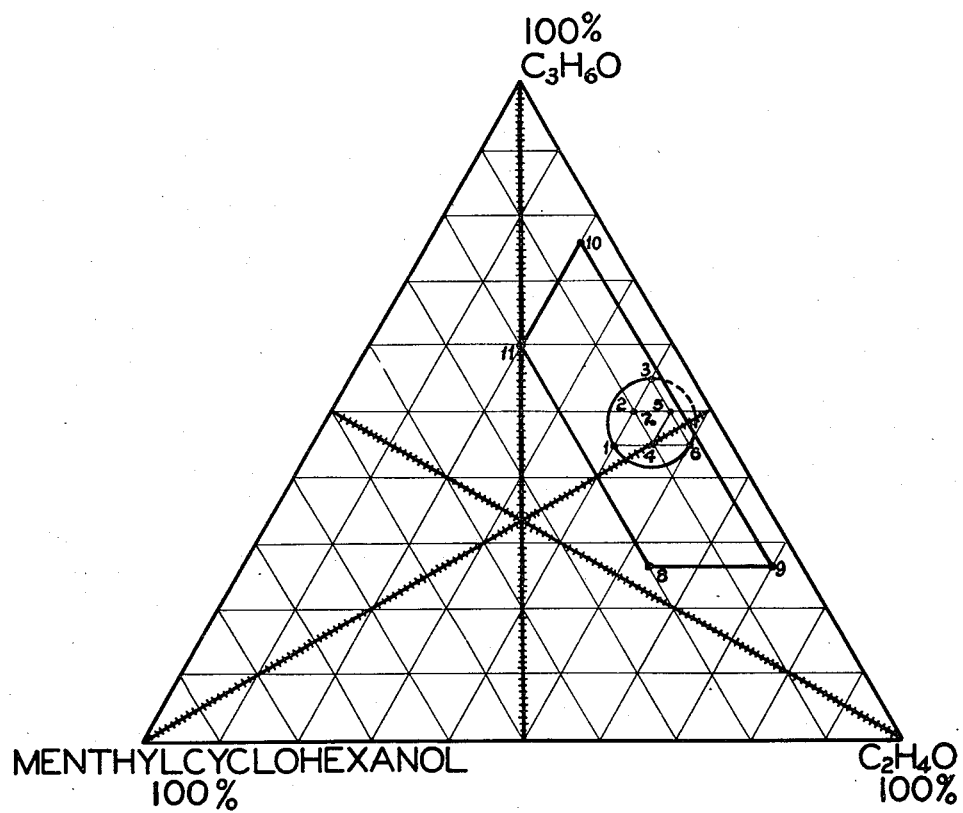

2,574,539

UNITED STATES PATENT OFFICE 2,574,539

CERTAIN PARA-MENTHYLCYCLOHEXANOL ETHERS OF CERTAIN GLYCOLS

Melvin De Groote, University City, and Arthur F. Wirtel and Owen H. Pettingill, Kirkwood, Mo., assignors to Petrolite Corporation, Ltd., Wilmington, Del., a corporation of Delaware Application November 1, 1949, Serial No. 124,812

6 Claims. (Cl. 260—611)

The present invention is concerned with certain new chemical products, compounds, or composition which have useful application in various arts. It includes methods or procedures for manufacturing said new chemical products, compounds or compositions, as well as the products, compounds or compositions themselves.

We have discovered that if one treats para-menthylcyclohexanol with a combination of propylene oxide and ethylene oxide within the proportions hereinafter specified, the mixed menthylcyclohexanol glycol ether so obtained is an unusually effective demulsifying agent for water-in-oil emulsions, and also has utility in various other arts hereinafter described. One specific example exemplifying the herein contemplated compounds is the product obtained by reacting one pound mole of para-menthylcyclohexanol with 23 pound moles of propylene oxide, followed by reaction with 27 pound moles of ethylene oxide. Such oxyalkylations are usually conducted in the presence of an alkaline catalyst. This specific compound just mentioned is one of a series of similar compounds having, in the main, the same general structure or composition.

Previous reference has been made to the fact that the herein specified products are of particular value for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

This specific application or use of our reagents is described and claimed in our co-pending application Serial No. 124,811, now Patent No. 2,558,510, filed November 1, 1949.

The compounds herein described are not only useful for breaking oil field emulsions, but also are useful for various other purposes, such as a break-inducer in the doctor treatment of sour hydrocarbons, as an emulsifying agent, as a component in the preparation of micellar solutions, as an additive to non-hydrocarbon lubricants, as an intermediate for further reaction by virtue of the terminal hydroxyl radical, etc.

It is well known that a variety of compounds containing a reactive hydrogen atom, i. e., a hydrogen atom attached to oxygen, nitrogen, or sulphur will react with alkylene oxides, particularly ethylene oxide or propylene oxide, to yield the corresponding glycol or polyglycol derivative. Such oxyalkylated derivatives are readily prepared from chemical compounds in which the hydrogen atom is directly attached to oxygen, and particularly in the case of alcohols or phenols, such as aliphatic alcohols, phenols, alkyl-aryl alcohols, alicyclic alcohols, phenoxyalkanols, substituted phenoxyalkanols, etc. Generally speaking, it has been found advantageous to react a water-insoluble hydroxylated material, having 8 carbon atoms or more, with an alkylene oxide so as to introduce water-solubility, or at least, significant or distinct hydrophile character, with the result that the derivative so obtained has surface-active properties.

Examples of suitable reactants of this type include octyl alcohol, decyl alcohol, dodecyl alcohol, tetradecyl alcohol, octadecyl alcohol, butylphenol, propylphenol, propylcresol, hexylphenol, octylphenol, nonylphenol, and cardanol, as well as the corresponding alicyclic alcohols obtained by the hydrogenation of the aforementioned phenols. It has been suggested that at least some of such materials be used in the resolution of petroleum emulsions. As far as we are aware, none of such materials represent products which are acceptable in demulsification today from a competitive standpoint. In the majority of cases such products are apt to be one-sixth, one-fifth, one-fourth, or one-third as good as available demulsifying agents on the same percentage-of-active-material basis, or same cost basis.

We have discovered a very few exceptions to the above general situation. For example, we have discovered, if one treats para-menthylcyclohexanol with ethylene, oxide and propylene oxide so as to yield a cogeneric mixture of glycol ethers, that such mixed derivative has unusual properties, provided that the composition lies within a certain range, as hereinafter specified. A specific exemplification of this range is the product obtained by treating one mole of para-menthylcyclohexanol with 23 moles of propylene oxide, and then with 27 moles of ethylene oxide. Similarly, one may treat the para-menthylcyclohexanol with the 27 moles of ethylene oxide first and then with the 23 moles of propylene oxide next.

In subsequent paragraphs from time to time reference is made to "compounds or cogeneric mixtures." At first glance it may appear that such language is indefinite, and, perhaps, contradictory. It is the intention at the moment only to point out that there is no inconsistency in such description, and that subsequently, there will be a complete explanation of why such designation is entirely proper.

The cogeneric mixtures of glycol ethers of para-menthylcyclohexanol are unusually effective demulsifying agents on a comparatively small number of oil field emulsions, which, oddly enough, appear rather widely distributed geographically. These para-menthylcyclohexanol ether mixtures do not appear to be universally competitive, and, as a matter of fact, appear to be highly selective in regard to their action as demulsifying agents. However, such products have significant utility in a number of different oil fields where they serve better than any other available demulsifying agent. Their utility may, of course, increase as time goes along.

Para-menthylcyclohexanol is obtained by the hydrogenation of menthylphenol. The procedure is essentially the same as employed in the conversion of phenol to cyclohexanol. Menthylphenol has been supplied by the Hercules Powder Company, Wilmington, Delaware. The formula of menthylphenol is believed to be as follows:

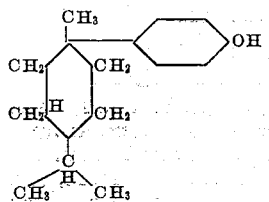

The product obtained by hydrogenation is, of course, the corresponding cyclohexanol, to wit, menthylcyclohexanol, the formula of which is as follows:

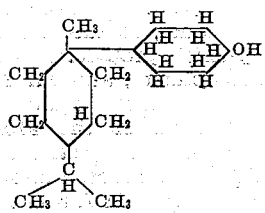

The molecular weight of para-menthylcyclohexanol is 232; the commercial product actually shows a molecular weight slightly more. For convenience, we have taken the molecular weight of the commercial product as 238.

It is very peculiar that the effectiveness of the demulsifying agents herein described seem to be limited to a very narrow range or area, as far as composition goes. Reference is made to the accompanying drawing, in which there is presented a triangular graph showing the composition of certain glycol menthylcyclohexanol, or cogeneric mixtures thereof, derivable from para-menthylcyclohexanol and ethylene oxide alone, or para-menthylcyclohexanol and propylene oxide alone, or para-menthylcyclohexanol and ethylene oxide, in terms of the initial reactants. We have found that effective demulsifying agents lie approximately within a small and hitherto unsuspected area indicated by the trapezoid determined by the points 8, 9, 10 and 11. More specifically, particularly effective demulsifying agents appear within a smaller range, as set forth approximately by the area indicated by the segment of a circle in which the area of the segment is limited to derivatives in which menthylcyclohexanol contributes at least 4% by weight of the ultimate compound.

The circle itself is identified by the fact that the points 1, 3 and 6 appear on the circle. The more effective of these better compounds or cogeneric mixtures are those which appear within the triangle which represents part of the circle and part of the segment, to wit, the triangle identified by the points 1, 3 and 6. The most effective compounds or cogeneric mixtures of all are those which fall within the inner central triangle of the larger outer triangle identified by the points 1, 3 and 6, to wit, the smaller triangle identified by the points 2, 4 and 5. The most outstanding of these effective compounds or cogeneric mixtures is one which appears to fall substantially at the center of the smaller triangle identified by point 7. This particular point is obtained by treating one mole of para-menthylcyclohexanol with 23.5 moles of propylene oxide, followed by treatment with 27.5 moles of ethylene oxide.

In spite of the unique character of the compounds previously described, we have made additionally an invention within an invention. This can be illustrated by reference to the compounds or cogeneric mixtures whose composition is determined by the inner triangle 2, 4, 5. This preferred class of derivatives, or, for that matter, all the herein described products, can be made in three different ways: (a) by adding propylene oxide first and then ethylene oxide; (b) by adding the ethylene oxide first and then propylene oxide; or (c) by adding the two oxides by random, indifferent, or uncontrolled addition so as to produce a polyglycol ether, in which the propylene radicals or ethylene radicals do not appear in continuous succession but are heterogeneously distributed.

We have found that if propylene oxide is added first and then ethylene oxide is added, that the compounds so obtained are invariably and inevitably more effective as demulsifiers, and are also more effective for other purposes than any other comparable glycol ethers of para-menthylcyclohexanol made by combining the three reactants in any other sequence. This will be explained further with additional illustrations subsequently.

As an illustration of the preparation of various compounds or cogeneric mixtures, and particularly the most desirable ones, and also those which are helpful in setting the limits in the graph previously referred to, the following examples are included. In connection with these examples it will be noted that the oxyalkylation of para-menthylcyclohexanol, i. e., by treatment with ethylene oxide or propylene oxide or a mixture of the two, is conventional. The procedure is conducted in the same manner employed in connection with other alcohols or the like, and generally, an alkaline catalyst is employed. See, for example, U. S. Patent No. 2,440,093, dated April 20, 1948, to Israel, and British Patent No. 602,591, applied for February 12, 1945.

*Example 1*

The reaction vessel employed was a stainless steel autoclave with the usual devices for heating, heat control, stirrer, inlet, outlet, etc., which is conventional in this type of apparatus. The capacity was approximately 40 gallons. The stirrer operated at a speed of approximately 250 R. P. M. There were charged into the autoclave 23.8 pounds of para-menthylcyclohexanol. There were then added one pound 3 ounces (approximately 5% by weight) of ground caustic soda. The autoclave was sealed, swept with nitrogen gas, and stirring started immediately and heat applied, and the temperature allowed to rise to approximately 150° C. At this point the addition of propylene oxide was started. It was added continuously at such speed that it was absorbed by the reaction as rapidly as added. The amount of propylene oxide added was 136 pounds. The time required to add this propylene oxide was slightly in excess of one hour, about 1¼ hours. During this time the temperature was maintained at 150° to 160° C., using cooling water through the inner coils when necessary and otherwise applying heat, if required. At the end of the addition of the propylene oxide there was added ethylene oxide, as previously indicated. The amount of ethylene oxide added was 120.5 pounds. The temperature employed, and operating conditions, were the same as with the addition of propylene oxide. It is to be noted, however, that ethylene oxide appears to be more reactive and the reaction seems to require a greater amount of cooling water to hold the temperature range as indicated. The time required to add the ethylene oxide was about the same, or slightly less, usually just a little more than an hour.

During the addition of the oxides the pressure was held at approximately 50 pounds per square inch gauge pressure, or less. When all the oxide had been added (ethylene oxide being the final addition in this particular instance) the autoclave was permitted to stay at the same temperature range for another half hour, even longer, if required, or until the gauge pressure had been reduced to zero, or substantially zero, indicating the reaction was complete.

The final product was an oily material, somewhat viscous in nature, and having a sort of greenish hue, without any definite odor. It was dispersible in water and soluble in non-aqueous solvents, such as aromatic hydrocarbons and others, although not soluble in some non-polar hydrocarbon solvents. The final yield was substantially the total weight of the initial reactants.

*Example 2*

The same procedure was followed as in Example 1, preceding, except that the order of addition of the oxides was reversed, the ethylene oxide being added first and the propylene oxide last. The time period, temperature range, pressure, etc., were kept the same as in Example 1, preceding.

*Example 3*

The same procedure was followed as in Example 1, except that a mixture, to wit, 256.5 pounds of propylene oxide and ethylene oxide, were added over a 2-hour period. This mixture of ethylene oxide and propylene oxide was obtained from 136 pounds of propylene oxide and 130.5 pounds of ethylene oxide. In this instance again the time range, temperature, and pressure were kept substantially the same as in Example 1, preceding.

*Example 4*

The same procedure as in Example 1, preceding, was conducted on a laboratory scale, employing a small autoclave having a capacity of approximately one liter, up to a 5-gallon size. The amount of paramenthylcyclohexanol employed was 47.6 grams, the amount of propylene oxide employed was 272 grams, and the amount of ethylene oxide employed was 241 grams. The amount of caustic soda employed was 2.4 grams. The operating conditions were substantially the same as on a larger scale. Actually, the reaction seemed to go faster in the small autoclave and the time of absorption could be reduced, if desired. In many instances, absorption would take place in the laboratory autoclave in a fraction of the time required in the larger autoclave; in fact, in many instances, absorption was complete in 5 to 10 or 15 minutes, as compared to one hour on a larger scale. Needless to say, on a large scale, addition must be conducted carefully because there is an obvious hazard in handling a large quantity of material in an autoclave which is not necessarily present in the use of a small vessel.

*Example 5*

The same procedure was followed as in Example 4, preceding, in every respect, except the variation described in Example 2, preceding, i. e., the ethylene oxide, was added first and the propylene oxide added last.

*Example 6*

The same procedure was followed as in Example 4, in every instance except the modification previously described in Example 3, to wit, the propylene oxide and the ethylene oxide, were mixed together and added in approximately 15 minutes to one-half hour. In all other respects the procedure was identical with that described in Example 4.

The following table includes a series of compounds or cogeneric mixtures which have been selected as exemplifying the herein included products. Types of the herein noted compounds or cogeneric mixtures have been produced in three different ways: (a) first adding the propylene oxide and then the ethylene oxide; (b) first adding the ethylene oxide and then the propylene oxide; and (c) mixing the ethylene oxide and the propylene oxide all together and adding them simultaneously.

The data are summarized in the following table:

| Ex. No. | Menthylcyclohexanol | | | Propylene Oxide | | | Ethylene Oxide | | | Point on Graph identifying specific Glycol Ethers |
|---|---|---|---|---|---|---|---|---|---|---|
| | Wt. Used in Grams | Molal Ratio | Wt. Per Cent in Final Glycol Ether | Wt. Used in Grams | Molal Ratio | Wt. Per Cent in Final Glycol Ether | Wt. Used in Grams | Molal Ratio | Wt. Per Cent in Final Glycol Ether | |
| A | 238 | 1.0 | 15.0 | 715 | 12.32 | 45 | 635 | 14.43 | 40 | 1 |
| B | 238 | 1.0 | 10.0 | 1,192 | 20.55 | 50 | 953 | 21.65 | 40 | 2 |
| C | 238 | 1.0 | 5.0 | 2,620 | 45.15 | 55 | 1,910 | 43.3 | 40 | 3 |
| D | 238 | 1.0 | 10.0 | 1,071 | 18.50 | 45 | 1,071 | 24.38 | 45 | 4 |
| E | 238 | 1.0 | 5.0 | 2,382 | 41.1 | 50 | 2,140 | 48.6 | 45 | 5 |
| F | 238 | 1.0 | 5.0 | 2,145 | 37.0 | 45 | 2,380 | 54.2 | 50 | 6 |
| G | 238 | 1.0 | 8.5 | 1,360 | 23.42 | 48.5 | 1,205 | 27.4 | 43 | 7 |
| H | 238 | 1.0 | 9.2 | 1,258 | 21.64 | 48.6 | 1,092 | 24.82 | 42.2 | (1) |
| I | 238 | 1.0 | 9.0 | 1,255 | 21.62 | 47.4 | 1,154 | 26.2 | 43.6 | (1) |
| J | 238 | 1.0 | 4.8 | 1,248 | 21.5 | 46.2 | 1,218 | 27.65 | 45.0 | (1) |
| K | 238 | 1.0 | 8.6 | 1,356 | 23.38 | 49.0 | 1,202 | 27.3 | 43.4 | (1) |
| G | 238 | 1.0 | 8.5 | 1,360 | 23.42 | 48.5 | 1,205 | 27.4 | 43.0 | 2 7 |
| L | 238 | 1.0 | 8.4 | 1,321 | 22.75 | 46.6 | 1,275 | 29.0 | 45.0 | (1) |
| M | 238 | 1.0 | 8.2 | 1,438 | 24.75 | 49.5 | 1,230 | 27.95 | 42.3 | (1) |
| N | 238 | 1.0 | 8.0 | 1,444 | 24.86 | 48.5 | 1,295 | 29.4 | 43.5 | (1) |
| O | 238 | 1.0 | 7.8 | 1,446 | 24.90 | 47.4 | 1,370 | 31.15 | 44.8 | (1) |
| P | 238 | 1.0 | 7.0 | 1,668 | 28.72 | 49.0 | 1,496 | 33.05 | 44.0 | (1) |
| Q | 238 | 1.0 | 6.0 | 1,965 | 33.90 | 49.5 | 1,766 | 40.2 | 44.5 | (1) |
| R | 238 | 1.0 | 20.0 | 309 | 5.33 | 26.0 | 643 | 14.6 | 54.0 | 3 8 |
| S | 238 | 1.0 | 4.0 | 1,548 | 26.7 | 26.0 | 4,170 | 94.7 | 70.0 | 3 9 |
| T | 238 | 1.0 | 4.0 | 4,520 | 77.8 | 76.0 | 1,190 | 27.0 | 20.0 | 3 10 |
| U | 238 | 1.0 | 20.0 | 714 | 12.3 | 60.0 | 238 | 5.42 | 20.0 | 3 11 |

¹ Within inner triangular area.   ² Duplicated for convenience.   ³ Indicates limits of trapezoidal area.

In the preparation of the above compounds the alkaline catalyst used was either flake caustic soda finely ground with mortar and pestle, or powdered sodium methylate, equivalent to 5% by weight of the para menthylcyclohexanol which was employed.

For reasons which are pointed out hereinafter in greater detail, it is substantially impossible to use conventional methods and obtain a single glycol ether of the kind described. Actually, one obtains a cogeneric mixture of closely related or touching homologues. These materials invariably have high molecular weights and cannot be separated from one another by any known method without decomposition. The properties of such a mixture represent the contribution of the various individual members of the mixture.

Although one cannot draw a single formula and say that by following such and such procedure, one can obtain 80% or 90% or 100% of such single compound, yet one can readily draw the formulae of a large number of compounds which appear in some of the mixtures described elsewhere, or can be prepared readily as components of mixtures which are manufactured conventionally. Such formulae, representing significant portions of various mixtures are of distinct value, insofar that they themselves characterize the invention, i. e., describe individual components which are typical of the members of the cogenic mixture. In the following formulae, since ROH can represent para-menthylcyclohexanol, RO is the ether radical obtained from para-menthylcyclohexanol by removal of the hydrogen atom attached to the oxygen atom.

(1) $RO(C_2H_4O)_{27}(C_3H_6O)_{23}H$
(2) $RO(C_2H_4O)_{28}(C_3H_6O)_{23}H$
(3) $RO(C_2H_4O)_{29}(C_3H_6O)_{23}H$
(4) $RO(C_2H_4O)_{27}(C_3H_6O)_{24}H$
(5) $RO(C_2H_4O)_{28}(C_3H_6O)_{24}H$
(6) $RO(C_2H_4O)_{29}(C_3H_6O)_{24}H$
(7) $RO(C_2H_4O)_{29}(C_3H_6O)_{25}H$
(8) $RO(C_2H_4O)_{30}(C_3H_6O)_{25}H$
(9) $RO(C_3H_6O)_{23}(C_2H_4O)_{27}H$
(10) $RO(C_3H_6O)_{23}(C_2H_4O)_{28}H$
(11) $RO(C_3H_6O)_{23}(C_2H_4O)_{29}H$
(12) $RO(C_3H_6O)_{24}(C_2H_4O)_{28}H$
(13) $RO(C_3H_6O)_{24}(C_2H_4O)_{29}H$
(14) $RO(C_3H_6O)_{24}(C_2H_4O)_{30}H$
(15) $RO(C_3H_6O)_{25}(C_2H_4O)_{30}H$
(16) $RO(C_3H_6O)_{12}(C_2H_4O)_{27}(C_3H_6O)_{11}H$
(17) $RO(C_3H_6O)_{13}(C_2H_4O)_{27}(C_3H_6O)_{10}H$
(18) $RO(C_3H_6O)_{14}(C_2H_4O)_{27}(C_3H_6O)_{9}H$
(19) $RO(C_3H_6O)_{15}(C_2H_4O)_{27}(C_3H_6O)_{8}H$
(20) $RO(C_3H_6O)_{16}(C_2H_4O)_{27}(C_3H_6O)_{7}H$
(21) $RO(C_2H_4O)_{14}(C_3H_6O)_{23}(C_2H_4O)_{13}H$
(22) $RO(C_2H_4O)_{15}(C_3H_6O)_{23}(C_2H_4O)_{12}H$
(23) $RO(C_2H_4O)_{16}(C_3H_6O)_{23}(C_2H_4O)_{11}H$
(24) $RO(C_2H_4O)_{17}(C_3H_6O)_{23}(C_2H_4O)_{10}H$
(25) $RO(C_3H_6O)_{12}(C_2H_4O)_{14}(C_3H_6O)_{11}(C_2H_4O)_{13}H$
(26) $RO(C_3H_6O)_{13}(C_2H_4O)_{15}(C_3H_6O)_{10}(C_2H_4O)_{12}H$
(27) $RO(C_3H_6O)_{14}(C_2H_4O)_{16}(C_3H_6O)_{9}(C_2H_4O)_{11}H$
(28) $RO(C_3H_6O)_{15}(C_2H_4O)_{14}(C_3H_6O)_{10}(C_2H_4O)_{11}H$
(29) $RO(C_3H_6O)_{14}(C_2H_4O)_{13}(C_3H_6O)_{12}(C_2H_4O)_{10}H$
(30) $RO(C_2H_4O)_{14}(C_3H_6O)_{12}(C_2H_4O)_{13}(C_3H_6O)_{11}H$
(31) $RO(C_2H_4O)_{12}(C_3H_6O)_{11}(C_2H_4O)_{15}(C_3H_6O)_{12}H$
(32) $RO(C_2H_4O)_{13}(C_3H_6O)_{10}(C_2H_4O)_{14}(C_3H_6O)_{13}H$

If one selects any hydroxylated compound and subjects such compound to oxyalkylation, such as oxyethylation or oxypropylation, it becomes obvious that one is really producing a polymer of the alkylene oxide, except for the terminal group. This is particularly true where the amount of oxide added is comparatively large, for instance, 10, 20, 30, 40, or 50 units. If such a compound is subjected to oxyethylation so as to introduce 30 units of ethylene oxide, it is well known that one does not obtain a single constituent, which, for the sake of convenience, may be indicated as $RO(C_2H_4O)_{30}H$. Instead, one obtains a cogeneric mixture of closely related homologues, in which the formula may be shown as the following: $RO(C_2H_4O)_nH$, wherein $n$, as far as the statistical average goes, is 30, but the individual members present in significant amount may vary from instances where $n$ has a value of 25 and perhaps less, to a point where $n$ may represent 35 or more. Such mixture is, as stated, a cogeneric, closely related series of touching homologous compounds. Considerable investigation has been made in regard to the distribution curves for linear polymers. Attention is directed to the article entitled "Fundamental Principles of Condensation Polymerization," by Paul J. Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description.

Actually, from a practical standpoint, it is much more satisfactory, perhaps, to describe the ultimate composition in terms of the reactants, i. e., menthylclohexanol and the two alkylene oxides. The reason for this statement is the following: If one selects a specific compound, it must be borne in mind that such compound is specific only insofar that the cogeneric mixture, in terms of a statistical average, will conform to this formula. This may be illustrated by an example such as $RO(C_3H_6O)_{23}(C_2H_4O)_{27}H$. If one combines the reactants in the predetermined weight ratio so as to give theoretically this specific component, and assuming only one chemical compound were formed, what happens is that, although this particular compound may be present in a significant amount and probably less than 50%, actually, one obtains a cogeneric mixture of touching homologues, in which the statistical average does correspond to this formula. For instance, selecting reactants, which, at least theoretically, could give the single compound $RO(C_3H_6O)_{23}(C_2H_4O)_{27}H$, what actually happens is, that one obtains a sort of double cogeneric mixture, for the reason that in each batch or continuous addition of alkylene oxide, a cogeneric mixture is formed. Since the present products require the addition of at least two different multi-molar proportions of each of two different alkylene oxides, (ethylene oxide and propylene oxide), it becomes obvious that a rather complex cogeneric mixture must result.

This can be best illustrated by example. Assume that one is going to use the indicated ratio, to wit, one pound mole of menthylcyclohexanol, 23 pounds of propylene oxide and 27 pounds of ethylene oxide. The initial step involves the treatment of one pound mole of menthylcyclohexanol with 23 pound moles of propylene oxide so as to yield theoretically $RO(C_3H_6O)_{23}H$; actually, as pointed out, one does not obtain $RO(C_3H_6O)_nH$ in which $n$ is 23, but one obtains a cogeneric mixture, in which there are present significant amounts of homologues, in which $n$ varies from 10, 11 and 12, on up to 35, 36 and possibly 40, or beyond. A statistical average, however, must, of course, correspond to the proportion of the initial reactants i. e., a compound of the formula $RO(C_3H_6O)_{23}H$, which is present undoubtedly to a significant extent.

When this cogeneric mixture is then subjected to reaction with 27 moles of ethylene oxide, it becomes obvious that, although one may obtain some RO(C3H6O)23(C2H4O)27H, yet this particular product can only be present to a minor extent for reasons which have been described in connection with oxyethylation and which now are magnified to a greater degree by oxypropylation. Stated another way, it is probable that the cogeneric mixture represents something like RO(C3H6O)n(C2H4O)n'H in which, as previously pointed out, components present in important percentages are those in which $n$ could vary anywhere from 10 or higher, up to 35 or 40. By the same token, components present in important percentages are those in which $n'$ could vary anywhere from 13 or 14, and possibly even less, up to 40, 41, 42, 43 or 45. Indeed homologues of a lower or a higher value of $n$ and $n'$ will be present in minor amounts, the percentages of such components decreasing, the further removed they are from the average composition. However, in spite of such variation in regard to the cogeneric mixture, the ultimate composition, based on the ingredients which enter into it and based on the statistical average of such constituents, can still be expressed by the formula

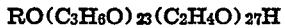

This actual product exists, to some degree, in the cogeneric mixture, but it should be looked upon as a statistical average formula, rather than the structure of a single or predominant compound in the mixture.

A second reason for employing a reaction mixture to describe the product, is the fact that the molal proportions need not represent whole numbers. We have just pointed out that if one selects molal proportions corresponding to

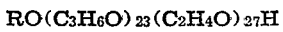

then the constituents are added in actual molar proportions based on whole numbers. If, however, one selects a point in the inner triangular area, which, when recalculated in terms of molar proportions, produces a fractional number, there is still no reason why such proportion of initial reactant should not be adopted. For instance, one might select a point in the triangular graph, which, when calculated in terms of molecular proportions, represents a formula, such as the following: RO(C3H6O)23.5(C2H4O)27H. This, of course, would be immaterial, for the reason that if one starts with a pound mole of menthylcyclohexanol and adds 23.5 pound moles of propylene oxide, one will obtain, on the average, a mixture closely comparable to the one previously described, using exactly 23 pound moles of propylene oxide instead of 23.5. Such mixture corresponds to the compound RO(C3H6O)23.5H only in the sense of the average statistical value, but not in the sense that there actually can be a compound corresponding to such formula. Further discussion of this factor appears unnecessary, in light of what has been said previously.

Such mixture could, of course, be treated with 27 pound moles of ethylene oxide. Actually, all that has been said sums up to this, and that is, that the most satisfactory way, as has been said before, of indicating actual materials obtained by the usual and conventional oxyalkylation process, is in terms of the initial reactants, and it is obvious that any particular point on the triangular graph, from a practical aspect, invariably and inevitably represents the statistical average of several or possibly a dozen or more closely related cogeners of almost the same composition, but representing a series of touching homologues. The particular point selected represents at least the composition of the mixture expressed empirically in the terms of a compound representing the statistical average.

Previous reference has been made to the fact that comparatively few oxyalkylated derivatives of simple hydroxylated compounds find utility in actual demulsification practice. We have pointed out that we have found a very few exceptions to this rule. The fact that exceptions exist, as in the instant invention, is still exceedingly difficult to explain, if one examines the slight contribution that the end group, derived from the hydroxylated material, makes to the entire compound. Referring, for the moment, to a product of the kind which has been described and identified by the formula RO(C3H6O)23(C2H4O)27H, it becomes apparent that the molecular weight is in the neighborhood of 2900, and actually, the para-menthylcyclohexanol contributes less than 10% of the molecular weight. As a matter of fact, in other comparable compounds the para-menthylcyclohexanol may contribute as little as 4% or 5%, and yet these particular compounds are effective demulsifiers. Under such circumstances, it would seem reasonable to expect that some other, or almost any other, substituted cyclic 6-carbon atom compound comparable to para-menthylcyclohexanol, would yield derivatives equally effective. Actually, this is not the case. We know of no theory or explanation to suggest this highly specific nature or action of the compound or cogeneric mixture derived from para-menthylcyclohexanol.

Referring to an examination of the previous list of 32 compounds, it is to be noted that in certain examples, for instance, Examples 9 to 15, inclusive, all the propylene oxide is added first and then the ethylene oxide is added. Compounds indicated by Examples 1 to 8 are substantially the same, as far as composition goes, but are reversed, insofar that the ethylene oxide is added first and then the propylene oxide. Other compounds having substantially the same ultimate composition, or at least, very closely related ultimate compositions, having a further variation in the distribution of the propylene oxide and ethylene oxide, are exemplified by Formulae 16 to 32, inclusive.

As has been pointed out previously, for some reason which we do not understand, and for which we have not been able to offer any satisfactory theory, we have found that the best compounds, or, more properly, cogeneric mixtures, are obtained when all the propylene oxide is added first and then all the ethylene oxide is added. Although this is true to at least some extent, in regard to all compositions within the trapezoidal area in the triangular graph, yet it is particularly true if the composition comes within the segment of the circle previously referred to in the drawing. In such event, one obtains a much more effective demulsifier than by any other combination employing ethylene oxide alone, propylene oxide alone, or any variation in the mixture of the two, as illustrated by other formulae. In fact, the compound, or cogeneric mixture so obtained, as far as demulsification is concerned, is not infrequently at least one-third better than any other derivative obtained in the manner described involving any of the other above variations.

The significance of what has been said previously becomes more emphatic when one realizes that, in essence, we have found that one "isomer" is a more effective demulsifying agent than another "isomer." The word "isomer" is not exactly right, although it is descriptive for the purpose intended, insofar that we are not concerned with a single compound, but with a cogeneric mixture, which, in its statistical average, corresponds to such compound. Stated another way, if we start with one pound mole of methylcyclohexanol, 23 pound moles of propylene oxide and 27 pound moles of ethylene oxide, we can prepare two different cogeneric mixtures, which, on a statistical average, correspond to the following:

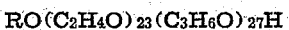

and

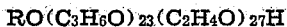

There is nothing we know which would suggest that the latter be a much more effective demulsifying agent than the former, and also that it be more effective for other industrial purposes. The applicants have had wide experience with a wide variety of surface-active agents, but they are unaware of any other similar situations, with the exception of a few instances which are the subject-matter of other co-pending applications, or under investigation. This feature represents the invention within an invention previously referred to, and, thus, becomes the specific subject-matter claimed in our co-pending applications Serial Nos. 124,813, now Patent No. 2,558,511, and 124,814, both filed November 1, 1949.

Reference has been made to the fact that the product herein specified, and particularly for use as a demulsifier, represents a cogeneric mixture of closely related homologues. This does not mean that one could not use combinations of such cogeneric mixtures. For instance, in the previous table, data have been given for preparation of cogeneric mixtures which statistically correspond, respectively, to points 1, 3 and 6. Such three cogeneric mixtures could be combined in equal weights so as to give a combination in which the mixed statistical average would correspond closely to point 7.

We need not add that instead of subjecting menthylcyclohexanol alone to oxyethylation, and oxypropylation, or inversely, oxypropylation and oxyethylation, or a simultaneous treatment of both oxides, one can employ a mixture of menthylcyclohexanol along with some other desired reactant, such as alpha-terpineol. For a number of reasons, it is ordinarily desirable to use a procedure in which only one product is reacted at a time.

Previous reference has been made to the fact that the herein described products or compounds have utility in fields other than demulsification. Since these products contain a terminal hydroxyl, they can, of course, be used as a source of new derivatives by reaction with acids, other oxides, such as phenyl ethylene oxide (styrene oxide), and the like. Such acids may be monocarboxy or polycarboxy, such as phthalic anhydride. The products may be used as assistants in forming emulsions, particularly emulsions which approach miceller solutions. An example of such emulsion is the following:

*Emulsion Example A*

| | Grams |
|---|---|
| Product of Example 1 | 8.9 |
| Sodium oleate | 16.0 |
| Sodium carbonate | 1.6 |
| Water | 22.0 |
| Kerosene | 51.5 |

In the preparation of the above emulsion the sodium carbonate is dissolved in the water and then the sodium oleate dissolved completely. After this mixture has been prepared, the product of Example 1 is then added and mixed until the mass is entirely homogeneous. Then the kerosene is added slowly, with constant stirring, until a completely smooth emulsion is produced.

We also desire to point out that very effective demulsifying agents and demulsifying agents can be obtained from compounds of the kind described by enhancing their water-solubility by the introduction of a sulfo group. For instance, two moles of any of the described derivatives can be reacted with one mole of maleic anhydride so as to give the complete ester. This complete ester can then be treated in the conventional manner with sodium bisulfite so as to give the corresponding manner with sodium bisulfite so as to give the corresponding sodium sulfo-succinate in the form of a sodium salt.

What has been said in regard to these compounds as demulsifiers also applies in regard to the use of the compounds for other purposes, to wit, emulsifiers, break inducers, etc. In other words, adding the propylene oxide first and then the ethylene oxide gives compounds which are superior for various industrial purposes, and this is true particularly when the composition of the compound is within the area designated by the segment of the circle in the drawing.

Throughout the specification elsewhere, reference has been made to homologues. It is quite likely that it would be equally proper in numerous instances, and perhaps all the herein described products, to refer to isomers as well as homologues. The reason for this statement is that propylene oxide, as differentiated from ethylene oxide, can, at least theoretically, combine with a hydroxylated material ROH to give two different derivatives, one being a primary alcohol and the other a secondary alcohol. This is illustrated by the following:

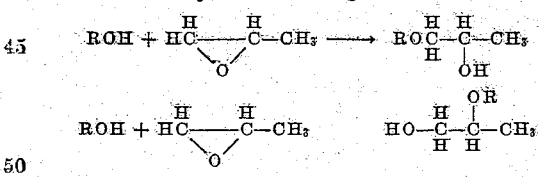

Elsewhere in the specification the word "isomer" has been used thus: "isomer." It is not believed there is any confusion between such terminology in that particular instance and what is said immediately preceding.

Attention is directed to the fact that the herein described compounds, compositions and the like which are particularly adapted for use as demulsifiers for water-in-oil emulsions, as found in the petroleum industry, are hydroxylated derivatives, i. e., carry or include a terminal hydroxyl radical as part of their structure. We have found that if such hydroxylated compound or compounds are reacted further so as to produce entirely new derivatives, such new derivatives have the properties of the original hydroxylated compound, insofar that they are effective and valuable demulsifying agents for resolution of water-in-oil emulsions, as found in the petroleum industry, as break inducers in doctor treatment of sour crude, etc.

Such hydroxylated compounds can be treated with various reactants such as glycide, epichlorohydrin, dimethyl sulfate, sulfuric acid, maleic anhydride, ethylene imine, etc. If treated with epichlorohydrin or monochloroacetic acid, the resultant product can be further reacted with a tertiary amine, such as pyridine, or the like, to give quaternary ammonium compounds. If treated with maleic anhydride to give a total ester the resultant can be treated with sodium bisulfite to yield a sulfo-succinate. Sulfo groups can be introduced also by means of a sulfating agent, as previously suggested, or by treating the chloroacetic acid resultant with sodium sulfite.

However, the class of derivatives most readily prepared in wide variety are the esters of monocarboxy and polycarboxy acids.

Assuming a typical derivative which can be indicated thus:

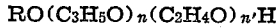

the ester of the monocarboxy acid is as follows:

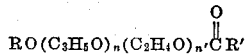

The acid ester of a dicarboxy acid is as follows:

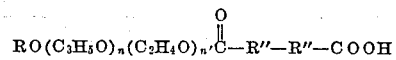

The complete ester of a dicarboxy acid is as follows:

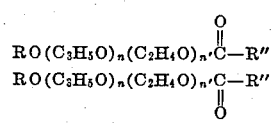

The chloroacetic acid ester is as follows:

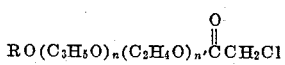

The quaternary compound obtained by reacting the above-mentioned product with pyridine is as follows:

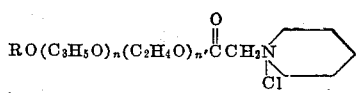

Among the various kinds of monocarboxy acids suitable for preparation of esters are the alpha-halogen monocarboxylic acids having not over 6 carbon atoms. Typical acids exemplifying this class are chloroacetic acid, dichloroacetic acid, bromoacetic acid, alpha-bromobutyric acid, etc. Needless to say, in this instance, and all others where reference is made to the acid, the functional equivalent, such as the acylchloride, the anhydride, the ester, the amide, etc., may be employed.

Another class of esters are those obtained from certain drastically-oxidized hydroxyacetylated castor oil fatty acids. The drastically-oxidized acetylated ricinoleic acid compounds are employed to furnish the acyl radical of the ester. In this particular instance, as in all other instances, one may prepare either a total ester or a partial ester, and when carboxy acids are employed one may have not only partial esters which have residual hydroxyl radicals or residual carboxyl radicals, but also partial esters in which both are present.

A somewhat similar type of ester is obtained from hydroxyacetylated drastically-oxidized castor oil fatty acids. It is to be pointed out that hydroxy-acetylation may take place first, and drastic oxidation subsequently, or the reverse may be true, or both procedures may be conducted simultaneously. In any event, such products supply acyl radicals of one type of ester herein included.

Another somewhat similar class are esters obtained from hydroxyacetylated drastically-oxidized dehydrated ricinoleic acid. In this class ricinoleic acid, castor oil, or the like is subjected to dehydration as an initial step. Such products may be employed to supply the acyl radical of one type of ester herein included.

Another type of ester which may be employed is a sulfo-fatty acid ester, in which there is present at least 8 and not more than 22 carbon atoms in the fatty acid radical. The sulfo-radical includes both the acid sulfonates and the sulfonic acids. Briefly stated, suitable sulfo-acids herein employed as reactants are sulfo-oleic, sulfo-ricinoleic, sulfo-aromatic fatty acids obtained, for example, from benzene, toluene, xylene, etc., and oleic acid or some other unsaturated acid.

Another class of acids are polycarboxy acids, such as commonly used in forming plasticizers, polyester resins, etc. One may use a tricarboxy acid, such as tricarballylic acid, or citric acid, but our preference is to employ a dicarboxy acid, or acid anhydride, such as oxalic acid, maleic acid, tartaric acid, citraconic acid, phthalic acid, adipic acid, succinic acid, azeleic acid, sebacic acid, adduct acids obtained by reaction between maleic anhydride, citraconic anhydride, and butadiene, diglycollic acid, or cyclopentadiene. Oxalic acid is not quite as satisfactory as some of the other acids, due to its tendency to decompose. In light of raw material costs, it is our preference to use phthalic anhydride, maleic anhydride, citraconic anhydride, diglycollic acid, adipic acid and certain other acids in the same price range which are both cheap and heat-resistant. One may also use adduct acids of the diene or Clocker type.

Another class of esters are derived from certain high molal monocarboxy acids. It is well known that certain monocarboxy organic acids containing 8 carbon atoms or more, and not more than 32 carbon atoms, are characterized by the fact that they combine with alkalies to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials and are the obvious equivalent of the unchanged or unmodified detergent forming acids. For instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and, of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

The monocarboxy detergent-forming esters of the oxy-alkylated derivatives herein described, are preferably derived from unsaturated fatty acids having 18 carbon atoms. Such unsaturated fatty acids include oleic acid, ricinoleic acid, linoleic acid, etc. One may employ mixed fatty acids, as, for example, the fatty acids obtained from hydrolysis of cottonseed oil, soyabean oil, etc. It is our ultimate preference that the esters of the kind herein contemplated be derived from unsaturated fatty acids, and more especially, unsaturated fatty acids containing a hydroxyl radical, or unsaturated fatty acids which have been subjected to oxidation. In addition to synthetic carboxy acids obtained by the oxidation of paraffins or the like, there is the somewhat analogous class obtained by treating carbon dioxide or carbon monoxide, in the presence of hydrogen or an olefine, with steam, or by causing a halogenated hydrocarbon to react with potassium cyanide and saponifying the product obtained. Such products or mixtures thereof, having at least 8 and not more than 32 carbon atoms, and having at least one carboxyl group or the equivalent thereof, are suitable as detergent-forming monocarboxy acids; and another analogous class equally suitable is the mixture of carboxylic acids obtained by the alkali treatment of alcohols of high molecular weight formed in the catalytic hydrogenation of carbon monoxide.

One may have esters derived not only from a single class of acids of the kind described, but also from more than one class, i. e., one may employ mixed esters such as esters obtained, for example, from high molal detergent-forming acids having 8 to 22 carbon atoms, as previously described, in combination with acids of the alphahalogen carboxy type having less than 8 carbon atoms, such as chloroacetic acid, bromoacetic acid, etc., as previously described.

Drastically-oxidized oil, such as drastically-oxidized castor oil, or drastically-oxidized dehydrated castor oil, may be employed to supply the acyl radical. In other instances, one may produce mixed esters by using polycarboxy acids, such as phthalic acid, diglycollic acid, etc., in combination with detergent-forming acids, such as oleic acid, stearic acid, naphthenic acid, etc.

Other carboxy acids may be employed in which there is also a sulfo group present, such as sulfophthalic sulfo-benzoic, sulfo-succinic, etc. Esters may be obtained from low molal hydroxylated acids having less than 8 carbon atoms, such as hydroxyacetic acid, lactic acid, etc. Similarly, one may employ low molal aliphatic acids having less than 8 carbon atoms, such as acetic acid, butyric acid, etc. Similarly, one may employ low molal acids having the vinyl radical, such as acrylic acid, methacrylic acid, crotonic acid, etc. It will be noted that these acids contain various numbers of acyl radicals varying generally up to 22 carbon atoms for the monocarboxy acids, and as many as 36 carbon atoms in the case of certain polycarboxy acids, particularly the dimer obtained by the dimerization of 9,11-octadecadienic acid. As to this particular product, see U. S. Patent No. 2,347,562, dated April 25, 1944, to Johnston.

Other suitable acids are cyclic monocarboxy acids having not over 32 carbon atoms. Examples of such acids include cyclohexane acetic acid, cyclohexane butyric acid, cyclohexane propionic acid, cyclohexane caproic acid, benzoic acid, salicylic acid, phenoxy acetic acid, etc.

The preparation of such esters are conventional and do not require elaborate description. Generally speaking, our procedure is to react the appropriate amount of a selected hydroxylated compound with the free acid in presence of a high boiling solvent, such as xylene, using 1% or 2% of para-toluene sulfonic acid along with a phase-separating trap until the amount of water indicates the reaction is complete, or substantially complete. The time required is usually 4 to 20 hours. Such esters are, as previously stated, very effective for resolution of water-in-oil emulsions, as found in the petroleum industry.

The triangular graph represents the three-component system. Using 4 reactants, i. e., the three depicted in the triangular graph, plus glycide, gives a four-reactant system which yields derivatives for demulsification of water-in-oil emulsions at least equal to those herein described. The use of glycide in a four-component reactant permits unusual structure, as, for example, a variety of furcation. Thus, the hydroxylated initial reactant can be treated with glycide in the conventional manner, using an alkaline catalyst, and after an introduction of a mole-for-mole ratio of glycide, then propylene oxide can be introduced in the manner previously described, and thereafter ethylene oxide can be added. If desired, the propylene oxide can be introduced first and then one mole of glycide added, followed by ethylene oxide, or both procedures can be employed.

Moreover, glycide can be used to replace a substantial part or greater part of the ethylene oxide, or propylene oxide, or both. Such compounds can be converted into various derivatives of the kind previously described. Under such circumstances, reaction with glycide and an end reactant to supply a terminal radical is not considered as forming a derivative but as simply forming the end material. The ester and similar derivatives so obtained from the four-component original system, i. e., the ones including glycide, are also very effective for demulsification of water-in-oil emulsions, as found in the oil industry.

Having thus described our invention, what we claim as new and desire to secure by Letters Patent is:

1. A cogeneric mixture of a homologous series of glycol ethers of para-menthylcyclohexanol; said cogeneric mixture being derived exclusively from para-menthylcyclohexanol, ethylene oxide and propylene oxide in such weight proportions so the average composition of said cogeneric mixture stated in terms of initial reactants lies approximately within the trapezoidal area defined approximately in the accompanying drawing by points 8, 9, 10 and 11.

2. A cogeneric mixture of a homologous series of glycol ethers of para-menthylcyclohexanol; said cogeneric mixture being derived exclusively from para-menthylcyclohexanol, ethylene oxide and propylene oxide in such weight proportions so the average composition of said cogeneric mixture stated in terms of initial reactants lies approximately within the segment of the circle in the accompanying drawing in which the minimum para-menthylcyclohexanol content is at least 4% and which circle is identified by the fact that points 1, 3 and 6 lie on its circumference.

3. A cogeneric mixture of a homologous series of glycol ethers of para-menthylcyclohexanol; said cogeneric mixture being derived exclusively from para-menthylcyclohexanol, ethylene oxide and propylene oxide in such weight proportions so the average composition of said cogeneric mixture stated in terms of initial reactants lies approximately within the triangular area defined in the accompanying drawing by points 1, 3 and 6.

4. A cogeneric mixture of a homologous series of glycol ethers of para-menthylcyclohexanol;

said cogeneric mixture being derived exclusively from para-menthylcyclohexanol, ethylene oxide and propylene oxide in such weight proportions so the average composition of said cogeneric mixture stated in terms of initial reactants lies approximately within the triangular area defined in the accompanying drawing by points 2, 4 and 5.

5. A cogeneric mixture of a homologous series of glycol ethers of para-menthylcyclohexanol; said cogeneric mixture being derived exclusively from para-menthylcyclohexanol, ethylene oxide and propylene oxide in such weight proportions so the average composition of said cogeneric mixture stated in terms of initial reactants lies approximately at point 7 in the accompanying drawing.

6. A single cogeneric mixture of a homologous series of glycol ethers of para-menthylcyclohexanol; said cogeneric mixture being derived exclusively from para-menthylcyclohexanol, ethylene oxide and propylene oxide in such weight proportions so the average composition of said cogeneric mixture stated in terms of initial reactants lies approximately at point 7 in the accompanying drawing.

MELVIN DE GROOTE.
ARTHUR F. WIRTEL.
OWEN H. PETTINGILL.

REFERENCES CITED

The following references are of record in the file of this patent:

UNITED STATES PATENTS

| Number | Name | Date |
|---|---|---|
| 1,976,677 | Wittwer | Oct. 9, 1934 |
| 2,176,834 | Bruson | Oct. 17, 1939 |
| 2,213,477 | Steindorf et al. | Sept. 3, 1940 |
| 2,425,755 | Roberts et al. | Aug. 19, 1947 |
| 2,425,845 | Toussaint et al. | Aug. 19, 1947 |